T. R. CRICK.
NUT LOCK.
APPLICATION FILED JUNE 3, 1914.
1,165,391.
Patented Dec. 28, 1915.
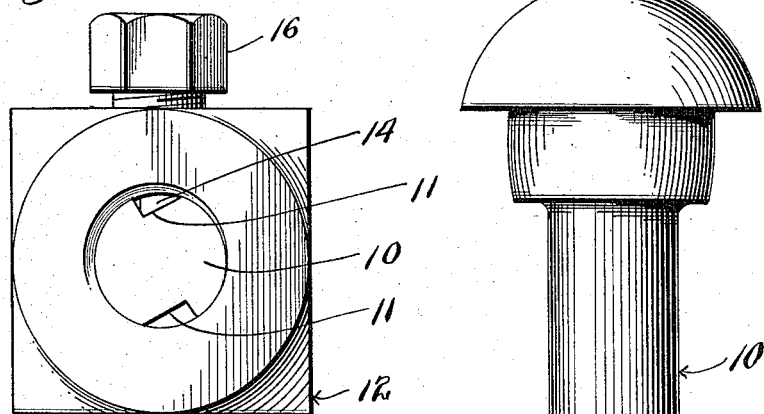
Fig. 1.
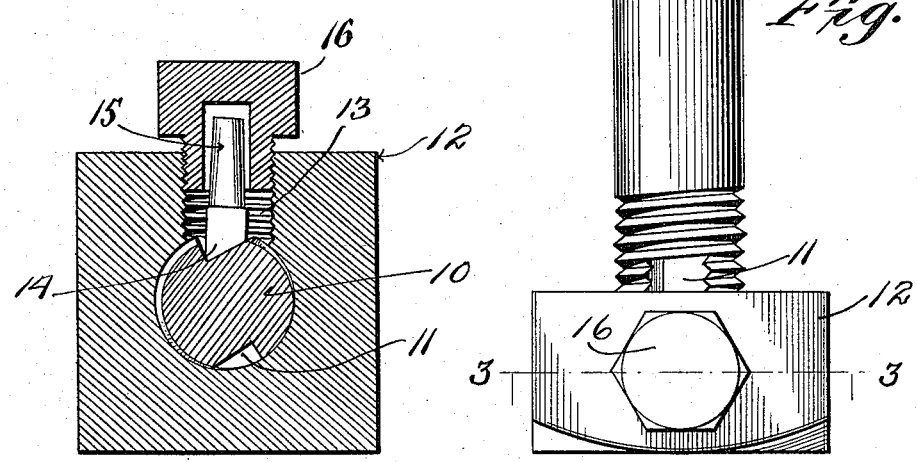
Fig. 2.
Fig. 3.
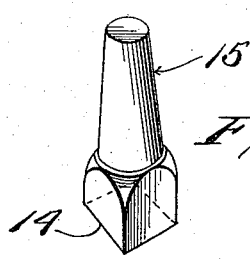
Fig. 4.
Witnesses
Inventor
T. R. Crick
By
Attorneys
COLUMBIA PLANOGRAPH CO., WASHINGTON, D. C.

UNITED STATES PATENT OFFICE.

THOMAS R. CRICK, OF SWEATMAN, MISSISSIPPI.

NUT-LOCK.

1,165,391.   Specification of Letters Patent.   Patented Dec. 28, 1915.

Application filed June 3, 1914. Serial No. 842,673.

*To all whom it may concern:*

Be it known that I, THOMAS R. CRICK, a citizen of the United States, residing at Sweatman, in the county of Montgomery, State of Mississippi, have invented certain new and useful Improvements in Nut-Locks; and I do hereby declare the following to be a full, clear, and exact description of the invention, such as will enable others skilled in the art to which it appertains to make and use the same.

This invention relates to improvements in nut locks.

The principal object of the invention is to provide a simple and novel device for locking the bolt and nut together, with means for locking the locking means so as to prevent the turning of the nut in either direction.

Other objects and advantages will be apparent from the following description, when taken in connection with the accompanying drawings.

In the drawings: Figure 1 is an end elevation of a bolt and nut to which my invention is applied. Fig. 2 is a top plan view. Fig. 3 is a transverse sectional view on the line 3—3 of Fig. 2. Fig. 4 is a perspective view of the pawl removed.

Referring particularly to the accompanying drawings, 10 represents a bolt, the threaded portion of which is formed with the longitudinally extending grooves 11. One wall of each of the grooves is formed on a line radiating from the center of the bolt, while the other wall extends approximately at right angles from the bottom edge of the other wall. Engaged on the bolt is a nut 12 formed with a threaded opening 13 through one of its side faces, said opening communicating with the central threaded opening of the nut. Disposed in the opening 13 and having a beveled nose 14 engaging in one of the grooves 11 is a pawl 15. The outer portion of this pawl is reduced and frusto-conical in cross section, while the inner portion is rectangular in cross section resulting in a shoulder between the frusto-conical and squared portions. A plug 16 is formed with a threaded stem and is adapted to be screwed into the opening 13 of the nut, the said plug being hollow and receiving the frusto-conical stem of the pawl.

In the normal position of the parts, the plug is screwed out to a sufficient point to permit the pawl to move upwardly into the plug when the nut is rotated. When the nut has been driven home, and to such a point that the beveled nose of the pawl is disposed in one of the grooves of the bolt, the plug is screwed in so as to engage its inner end with the shoulder of the pawl and hold the pawl rigidly in the groove of the bolt. Thus the nut cannot be turned farther toward application, nor can it be moved into a direction to unscrew it.

This device is particularly applicable to rotating parts where friction against the nut would have a tendency to unscrew the nut or screw the nut up tighter.

What is claimed is:

The combination with a longitudinally grooved bolt, of a nut engaged therein and having a threaded opening formed through one of its side faces communicating with the central opening of the nut, a hollow externally threaded plug engaged in the threaded opening, the threaded portion of the plug being shorter than the length of said threaded opening, and a pawl member disposed in the threaded opening and having a rectangular inner portion provided with a beveled nose engaging in the groove of the bolt and an outer frusto-conical portion loosely fitting in the hollow of the plug, said pawl member being of a length greater than the length of the threaded opening and the hollow of the plug whereby when said plug is screwed inwardly to its limit, the outer end of the hollow of the plug will engage the outer end of the frusto-conical portion of the pawl member and hold the beveled nose firmly in the groove of the bolt so that neither the bolt nor nut is capable of turning movement in either direction.

In testimony whereof, I affix my signature, in the presence of two witnesses.

THOMAS R. CRICK.

Witnesses:
A. L. CARR,
E. D. EMBRY.

Copies of this patent may be obtained for five cents each, by addressing the "Commissioner of Patents. Washington, D. C."